United States Patent
Gehman et al.

(10) Patent No.: US 7,620,743 B2
(45) Date of Patent: Nov. 17, 2009

(54) SYSTEM AND METHOD FOR IMPLEMENTING MULTIPLE INSTANTIATED CONFIGURABLE PERIPHERALS IN A CIRCUIT DESIGN

(75) Inventors: Judy M. Gehman, Ft. Collins, CO (US); Matthew D. Kirkwood, West St. Paul, MN (US); Steven M. Emerson, Chanhassen, MN (US)

(73) Assignee: LSI Corporation, Milpitas, CA (US)

( * ) Notice: Subject to any disclaimer, the term of this patent is extended or adjusted under 35 U.S.C. 154(b) by 596 days.

(21) Appl. No.: 10/817,419

(22) Filed: Apr. 1, 2004

(65) Prior Publication Data

US 2005/0223388 A1 Oct. 6, 2005

(51) Int. Cl.
*G06F 3/00* (2006.01)
(52) U.S. Cl. ............... 710/8; 710/17; 717/170
(58) Field of Classification Search .......... 710/8, 710/17; 717/170
See application file for complete search history.

(56) References Cited

U.S. PATENT DOCUMENTS

| | | | | |
|---|---|---|---|---|
| 4,775,931 A * | 10/1988 | Dickie et al. | ............... | 710/9 |
| 6,021,498 A * | 2/2000 | Wisor et al. | ............... | 713/300 |
| 6,044,225 A * | 3/2000 | Spencer et al. | ............... | 710/52 |
| 6,334,207 B1 | 12/2001 | Joly et al. | ............... | 716/17 |
| 6,366,874 B1 | 4/2002 | Lee et al. | ............... | 703/14 |
| 6,466,972 B1 * | 10/2002 | Paul et al. | ............... | 709/222 |
| 6,467,074 B1 | 10/2002 | Katsioulas et al. | ............... | 716/17 |
| 6,536,028 B1 | 3/2003 | Katsioulas et al. | ............... | 716/17 |
| 6,574,778 B2 | 6/2003 | Chang et al. | ............... | 716/1 |
| 6,578,174 B2 | 6/2003 | Zizzo | ............... | 716/1 |
| 2002/0100029 A1 * | 7/2002 | Bowen | ............... | 717/140 |

OTHER PUBLICATIONS

Sutherland, S.; "The IEEE Verilog 1364-2001 Standard What's New, and Why You Need It," 9th Annual International HDL Conference and Exhibition, Mar. 2000. pp. 1-8.
Cummings, C.; "Verilog-2001 Behavioral and Synthesis Enhancements," Revised Apr. 2002, pp. 1-23.
Cummings, C.; New Verilog-2001 Techniques for Creating Parameterized Models (or Down with 'define and Death of a defparam!) HDLCON 2002, pp. 1-10.
Wu, Y.; and MacDonald, P.; "Testing ASICs with Multiple Identical Cores," IEEE Transactions on Computer-Aided Design of Integrated Circuits and Systems, vol. 22, No. 3, Mar. 2003, pp. 327-336.
Miodrag Potkonjak et al. "Behavioral Synthesis of Area-Efficient Testable Designs Using Interaction Between Hardware Sharing and Partial Scan," IEEE Transactions on Computer-Aided Design of Integrated Circuits and Systems, vol. 14, No. 9, Sep. 1995, pp. 1141-1154.
Chih-Chang Lin et al. "Test-Point Insertion: Scan Paths Through Functional Logic," IEEE Transactions on Computer-Aided Design of Integrated Circuits and Systems, vol. 17, No. 9, Sep. 1998, pp. 838-851.
Claus Schneider et al. "Modular Metrology Tools for Productivity Enhancement in Wafer Fabs," IEEE International Symposium on Semiconductor Manufacturing, Conference Proceedings, 1997. Oct. 6-8, 1997. pp. B21-24.

(Continued)

*Primary Examiner*—Tariq Hafiz
*Assistant Examiner*—Jasjit S Vidwan
(74) *Attorney, Agent, or Firm*—William W. Cochran; Cochran Freund & Young LLC

(57) ABSTRACT

A reusable software block is adapted to control multiple instantiations of a peripheral device within a system. A device hardware abstraction layer defines offset values for registers of the peripheral device and a data structure for the peripheral device. A platform hardware abstraction layer defines an address map of the system, and is adapted to initialize each instantiation of the peripheral device via calls to the device hardware abstraction layer.

12 Claims, 5 Drawing Sheets

OTHER PUBLICATIONS

Tianhao Zhang et al. "Design of Reconfigurable Composite Microsystems Based on Hardware/Software Codesign Principles," IEEE Transactions on Computer-Aided Design of Integrated Circuits and Systems, vol. 21, No. 8, Aug. 2002, pp. 987-995.

Ryota Kasai et al. "An Integrated Modular and Standard Cell VLSI Design Approach," IEEE Journal of Solid-State Circuits, vol. SC-20, No. 1, Feb. 1985 pp. 407-412.

Jeff Vanderlip. "LSI Logic Physical RTL Optimization (LSI PRO)," LSI Logic Corporation, Oct. 31, 2002. pp. 1-7.

* cited by examiner

SYSTEM AND METHOD FOR IMPLEMENTING MULTIPLE INSTANTIATED CONFIGURABLE PERIPHERALS IN A CIRCUIT DESIGN

CROSS-REFERENCE TO RELATED APPLICATION

The present application is related to co-pending application Ser. No. 10/816,213, filed Apr. 1, 2004, the content of which is hereby incorporated by reference in its entirety.

FIELD OF THE INVENTION

The present invention relates to systems and methods for producing configurable peripherals and reusable software. More particularly, the present invention relates to systems and methods for designing and implementing configurable peripherals in an integrated circuit design.

BACKGROUND OF THE INVENTION

Over the past decade, constant innovations in silicon processing technology have drastically reduced the price and increased the performance and functionality of integrated circuit devices. As a result, industries are increasingly demanding integrated circuit design systems. Chip designs are therefore becoming larger and more complex and more application-specific.

With the increased demand from industry, electronics product development has become partially consumer driven, resulting in a shortened product life cycle. Thus, consumer demand has placed downward pressure on design time, and design managers increasingly are required to make crucial design decisions or predictions prior to some system component designs being complete.

Generally, a designer of a large-scale digital system begins with a high-level (abstract) idea of the tasks the system is to perform. To realize the system in some physical technology, such as a collection of integrated circuits, the designer determines how to implement the system through the interconnection of millions of transistors to perform the desired operations. The need to translate from a high-level conceptual view of the system to a specification of the complex interconnections among the millions of transistors is sometimes called the "abstraction gap".

To address the design time constraints and the predictive pressures placed on design managers, and to close this abstraction gap, electronic system design has moved toward a methodology referred to in the art as "block-based design". The block-based design methodology is a range of techniques that take advantage of existing component design blocks, which have been designed and tested previously. Such design blocks can be integrated into larger integrated circuit designs or into subsystems to perform various functions. These blocks are sometimes referred to as intellectual property blocks or IP blocks.

Conventional integrated circuit design methodologies are not well-suited for reuse of pre-designed circuit blocks. Without a comprehensive approach to block reuse, existing methodologies cause ad hoc and unpredictable design results, reduce design realization feasibility, and increase cost and time to delivery. Moreover, use of such blocks can trigger performance degradation to the blocks themselves and to the larger circuit.

Theoretically, reusable intellectual property or reusable IP can significantly reduce development time. Specifically, reusable IP should theoretically be reusable in the same manner on different chips, thereby reducing design time in terms of developing functional or logical elements to perform the same functions.

In general, there are two industry standard hardware description languages for electronic design and gate-level simulation for use in designing and generating integrated circuits. The two description languages are Verilog and VHDL ("Very High Speed Integrated Circuit (VHSIC) Hardware Description Language"). A hardware description language, such as Verilog, is used by a designer to model new integrated circuit designs. Verilog, for example, allows the engineer to represent the desired functionality as a software program. The model may then simulated on a computer to see if the design will work as intended. Problems can be corrected in the model and verified in simulation. Finally, the verified hardware description code can be synthesized into an integrated circuit.

The Verilog hardware description language was first introduced in 1984, as a proprietary language from Gateway Design Automation. In 1989, Gateway Design Automation was acquired by Cadence Design Systems, which released the Verilog hardware description language in the Verilog programming language interface to the public domain in 1990. Open Verilog International was formed to control the public domain Verilog, and to promote its usage. In 1993, Open Verilog International submitted a request to the IEEE to formally standardize Verilog 2.0. The IEEE formed a standards working group to create the standard, and, in 1995, IEEE adopt the Verilog standard as IEEE 1364-1995.

The IEEE 1364-1995 Verilog standard provided a significant step forward in terms of integrated circuit design and standardization of hardware description language protocols. However, the 1995 Verilog standard presented a problem with respect to multiple instantiations of configurable intellectual property in an integrated circuit design. In particular, multiple instantiations of intellectual property in a design, where different configurations are used for each instantiation, required special handling. Specifically, in order to handle multiple instantiations of a configurable peripheral or IP block in a chip design, the conventional flow required "uniquefying" or uniquely naming each peripheral instantiation so that they could co-exist with the same design.

Within software, multiple instantiations required header files to find register addresses which were renamed to co-exist. In other words, header files/C code were duplicated and renamed. Unfortunately, renaming the peripheral instantiations required the Register Transfer Level code (RTL) to be modified after verification, potentially introducing errors in the design. Additionally, duplicating and renaming header files required significant coding and debugging time. If the peripheral instantiation is renamed after verification, the uniquified RTL code should be verified to ensure that it is equivalent to the original RTL code. Both dynamic (simulation) and static (equivalence checking) may be used to verify the peripheral device. However, such a secondary verification process would take away some of the time-to-market benefits of reusable peripheral instantiations.

In general, it can often seem that designing integrated circuits is similar to writing a piece of software. Both the behavior and structural models of integrated circuit elements are written in the hardware description language, and can be changed, compiled, and simulated in a manner similar to writing, compiling and executing a program written in a high-level programming language, such as Java or C++, for example. However, the two processes are fundamentally different.

A hardware designer generally begins with a Functional Design Description (FDD), which provides the abstract descriptions of the functions the system will be capable of performing. The designer develops a functional and behavioral model, refines the model, and synthesizes the model into a structural model (i.e. a gate-level netlist). The gate-level netlist is then processed to generate the masks for an integrated circuit. The resulting integrated circuit consists of hardware storage elements for the FDD-defined registers, logic circuits that implement the FDD-specified instructions, and a memory system. In the final result, the integrated circuit is a physical chip (a piece of hardware). To change the processor, for example to add an instruction, every step in the chain of events must be repeated, and the resulting chip has additional logic circuits necessary to implement the new instruction. By contrast, a software developer writes and compiles the code into a software executable that resides in memory on a computer. A change in the code requires the designer to add lines of code, to recompile the revised code, and to store the recompiled code again.

SUMMARY OF THE INVENTION

In one embodiment, a reusable software block is adapted to control multiple instantiations of a peripheral device within a system. A device hardware abstraction layer defines offset values for registers of the peripheral device and a data structure for the peripheral device. A platform hardware abstraction layer defines an address map of the system, and is adapted to initialize each instantiation of the peripheral device via calls to the device hardware abstraction layer.

In another embodiment, a method of initializing multiple instances of a peripheral device within an integrated circuit is described. A peripheral device is coded in a device hardware abstraction layer. The coded peripheral device represents a functional and behavior model of a circuit element independent of the integrated circuit. The peripheral device of the device hardware abstraction layer is mapped onto the integrated circuit for each instantiation of the peripheral device.

In another embodiment, a system for instantiating multiple instances of a peripheral device within an integrated circuit uses a single configurable code block. A device hardware abstraction layer defines a configurable structure for the peripheral device. A platform hardware abstraction layer is adapted to configure the structure of each particular instantiation of the peripheral device via the device hardware abstraction layer.

DETAILED DESCRIPTION OF ILLUSTRATIVE EMBODIMENTS

In integrated circuit design, it is important to understand that customers have a wide range of needs, making it difficult to meet all of the customer's requirements with a one-size-fits all approach. Moreover, it is not economically viable to maintain a large number of solutions on-the-shelf. Therefore, it is desirable to use a more optimized solution, where the circuit is manufactured with the elements the customer wants and where the gate count can be minimal.

The systems and methods of an embodiment of the present invention provide opportunities for circuit designers and for software developers to more efficiently design integrated circuits using modular design techniques and using reusable software code. One embodiment of the present invention involves hardware-related methods for implementing configurable peripherals. Another embodiment of the present invention involves strategies for creating and implementing reusable software for use with the hardware peripherals. In a preferred embodiment, the hardware and the software related methods are employed together to produce a fully customized peripheral implementation with custom functionality.

In general, it will be understood by a worker skilled in the art that many commercially available synthesis tools work with logic design descriptions in Register Transfer Level (RTL) form. This also implies that the configurable instantiated peripheral can be retargetable to a range of integrated circuit types including custom integrated circuits, gate array and cell-based ASICs ("Application Specific Integrated Circuits"), FPGAs ("Field Programmable Gate Arrays") and PLDs ("Programmable Logic Devices"). While the acronym RTL suggests that the code describes the transformation of data as the data is passed between registers, RTL code can also apply to pure logic elements, meaning that registers are not required.

Figure 1:
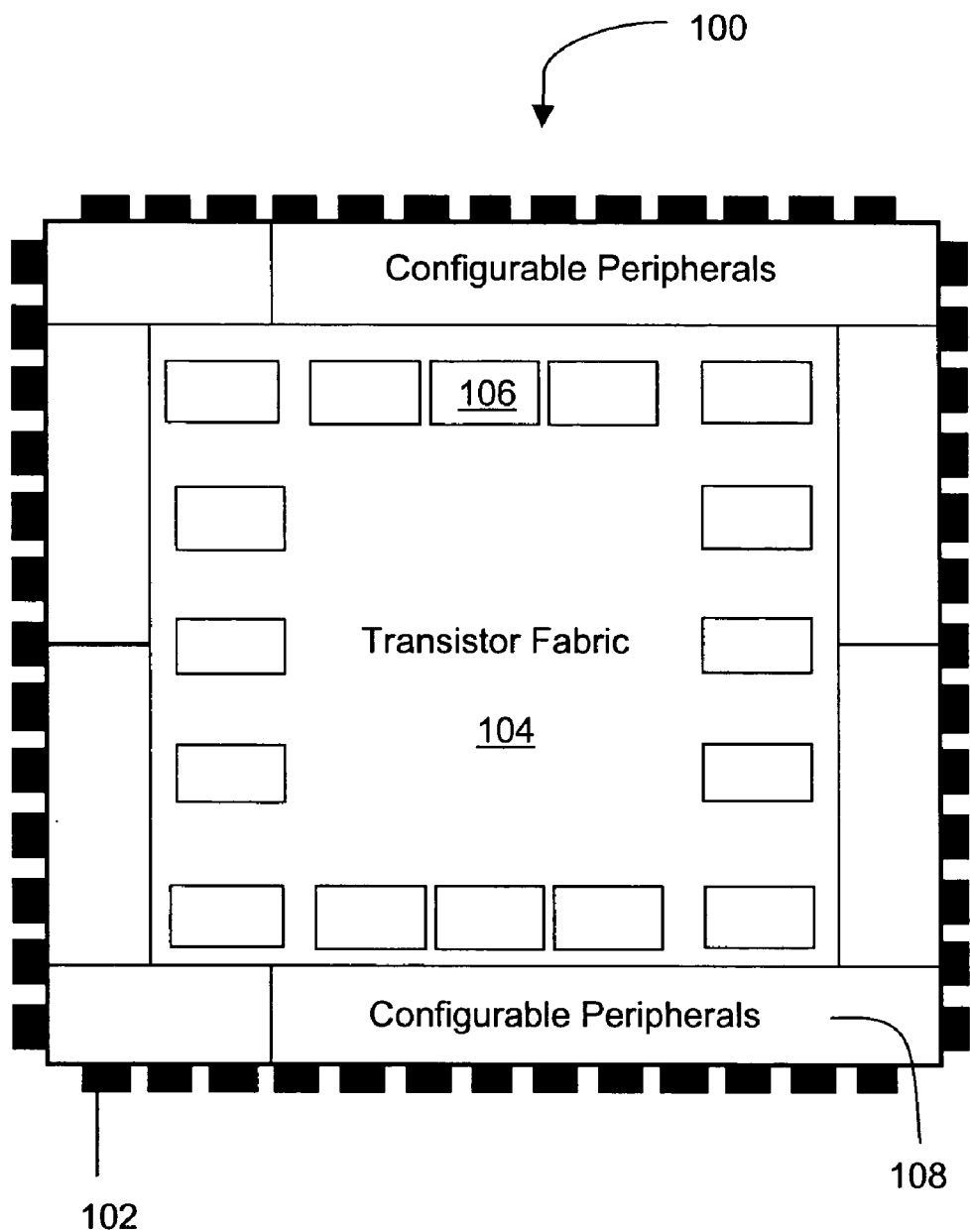
FIG. 1 is a simplified block diagram of an integrated circuit with configurable peripheral logic and various other logic structures.

FIG. 1 illustrates a simple block diagram of a semiconductor chip 100 synthesized from a hardware description language or RTL description. As shown, the chip 100 has one or more pin outs 102, transistor fabric 104, various circuit structures 106, and configurable peripherals 108. In general, the transistor fabric 104 may include interconnections between the various elements and gates and other combinational logic capable of transforming data as the data is passed between various structures 106, configurable peripherals 108, and/or pin outs 102.

In an embodiment of the present invention, the RTL code or HDL code describes the various structures and interconnections of the chip 100, as well as the configurable peripheral structures 108. During the synthesis process, the code is converted to logical structures for placement on the chip. As shown, more than one instance of a configurable peripheral 108 could be disposed on a single chip 100. The hardware-related (configurable peripherals) and software-related (reusable software) systems and methods of an embodiment of the present invention address systems and methods for implementing configurable peripherals and reusable software. The systems and methods are discussed below in separate sections.

1. Configurable Peripherals

Figure 2:
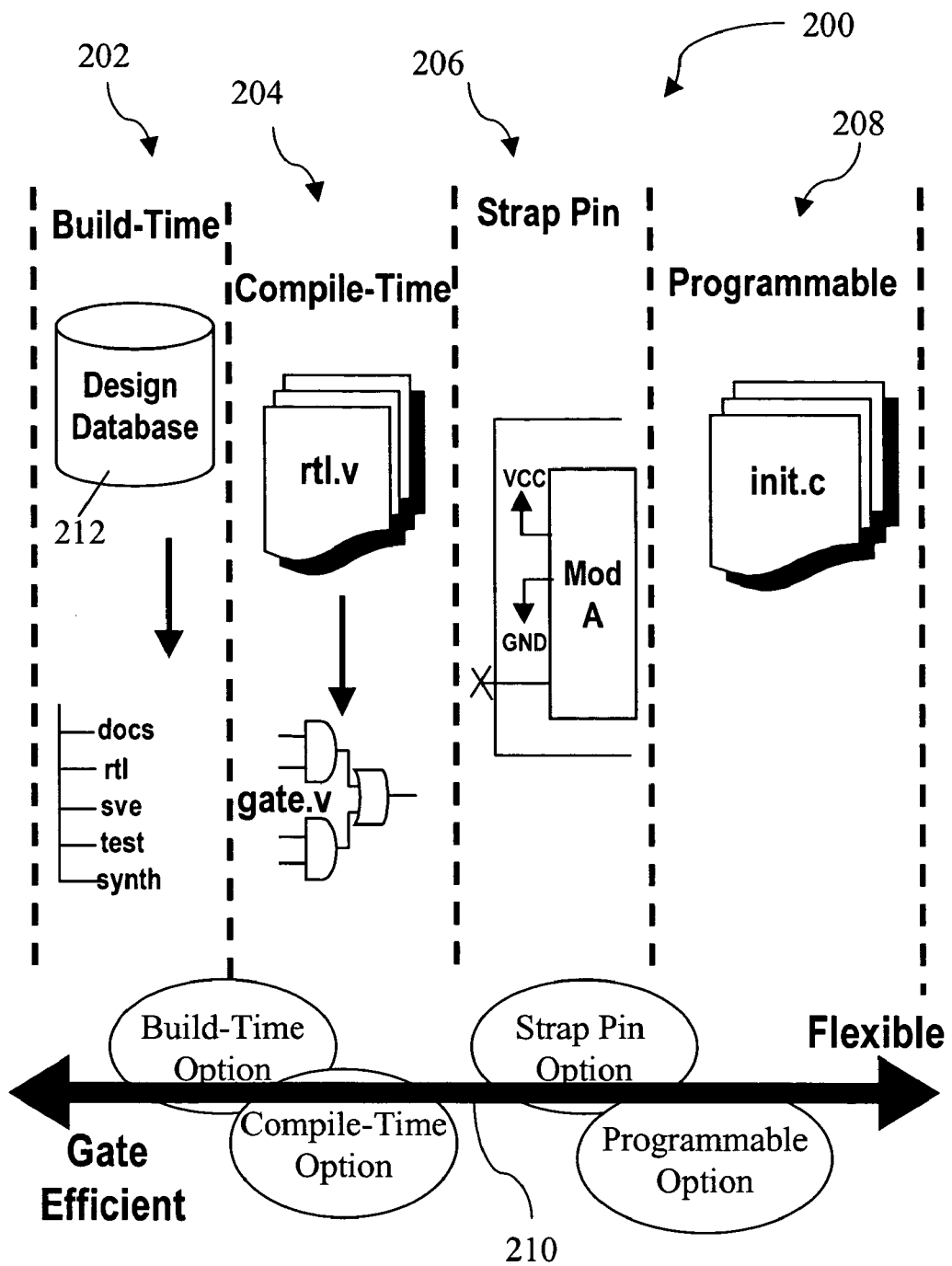
FIG. 2 is a simplified conceptual diagram of various hardware configuration options organized relative to a spectrum ranging from most gate efficient to most flexible.

As shown in FIG. 2, there are four options (indicated by reference numeral 200) for configuring a perhipheral: a build-time option 202, a compile-time option 204, a strap-pin option 206, and a programmable option 208. Each option 200 has its own advantages and disadvantages, which should be considered in deciding between the options. The choice as to which of these methods to use to design the configurable peripheral must be made when the configurable peripheral is designed. The designer must select between the methods according to the point in the design cycle that the designer wants to enable the customer to choose. Options listed toward the right side in FIG. 2 can be employed later in the design cycle and even after the silicon is fabricated, whereas options on the left side must be decided early in the design cycle, before the silicon is fabricated.

The four options 200 can be conceptualized as existing along a spectrum 210 ranging from gate efficient to flexible. In FIG. 2, dashed lines illustrate a conceptual separation between the options 200. However, in reality, these lines are somewhat blurred as they relate to the spectrum 210. As shown, the build-time option 202 and the compile-time option 204 partially overlap, with the build-time option 202 being slightly more gate efficient than the compile time option 204. On the other end of the spectrum, the strap pin option 206 and the programmable option 208 overlap, with the programmable option being slightly more flexible than the strap pin option.

It will be understood by a worker skilled in the art that the options 200 are not necessarily mutually exclusive, and that in each case, optimal efficiency for a particular implementation may involve one or more of the options 200.

1.1. The Build-Time Configurable Hardware Option

In general, the build-time option 202 refers to the option of designating gates and other elements of the peripheral at the outset. The build-time option 202 is selected by the circuit designer when the design is pulled from a design database 212. In general, the build time-option 202 is the most gate-efficient of the four options, but provides the least flexibility relative to the programmable option 208.

To make use of the efficiencies of the build-time option 202, the requirements of the end design must be known from the outset. Unfortunately, in many instances, the customer may not know what he or she wants or what is required until late in the design flow, so it is often desirable to push off the decision-making until later in the design process. In a preferred embodiment, the build time option 202 and the compile time option 204 are generally less desirable than later, more flexible design options.

1.2. Compile-Time Configurable Hardware Option

In general, the compile-time option 204 includes the use of specific directives within the hardware description language (whether the language is VHDL, Verilog, or another hardware description language. The compile-time options 204 are selected by the designer when the design is synthesized. In one embodiment of the present invention, the compile time option 204 uses 'define directives and parameter statements to configure the peripherals.

The 'define directive is a compiler directive used to define text macros in the Verilog hardware description language. The 'define directive is used in configurable peripheral design to include or exclude various elements, including a pin on a module pin list or when instantiating a module, logic in the module, variables in continuous assignment statements, and "always" procedure statements and their sensitivity lists. Additionally, the 'define directive is used to instantiate an entire module, to choose between two modules, to specify the width of buses when they are declared and used, to specify various constants in a module (such as values for states for a state machine or for AHB bus definitions), and to create other configuration constants based on top level configuration settings.

Within the Verilog hardware description language, the Verilog compiler substitutes the text of the macro wherever it encounters the 'define directive. This substitution is performed for the entire design, so the 'define directive and its associated text macros are global, and are substituted at every level of the design. When a design uses more than one instantiation of a configurable peripheral, the 'define text macros interfere with each other. The compiler will use only one of the definitions for the entire design. In order to have multiple instantiations within a single design, the designer has to provide a unique name for each instantiation so that the instantiation's name does not interfere with any of the other multiply instantiated peripherals and with any name a customer uses in the top-level design. In general, the global scope of the 'define directive is not desirable for multiple instantiations of configurable peripherals when the instantiations are intended to be different configurations of the peripheral.

If a design has more than one instantiation of a configurable peripheral that uses 'define compiler directives to perform the configuration and if that design uses different configurations for the instantiations, the configurable peripheral's RTL code must be modified. The modification includes altering the configurable peripheral file names, the module names, and the 'define text macros names to make entirely separate peripherals. These alterations eliminate the problem of the 'define macro names interfering with each other.

In general, the 'define techniques are less desirable than the parameter/generate statement methods of the present invention. By contrast to the build time and compile time options, parameters are run time constants (effectively a compile time option, but the scoping rules are different) and can be overridden individually at elaboration time to allow module instances to be customized. The keyword "parameter" in Verilog announces the declaration of a constant and typically assigns a value to that constant. An example of such a statement appears below.

parameter number_of_bits=32;

In this line of code, the parameter keyword declares a constant called "number_of_bits" and assigns to that constant a value of 32. Verilog allows the designer to override the constant value during instantiation using a define parameter statement ("defparam"). The defparam statement permits the declared values of the parameter within a module to be overridden at instantiation. For example, if a module "foo" defines the parameter number_of_bits as shown above, this may be overridden in the top level module as follows:

defparam a.num_of_bits=8;
    defparam b.num_of_bits=64;
    foo a( );
    foo b( );

The "foo a( )" and "foo b( )" statements instantiate the module foo and override the value of the internally declared parameter, number_of_bits, with the numbers 8 and 64, respectively.

Alternatively, parameter instances can also be overridden during module instantiation. For example, given a module having defined internal parameters as follows:

module xyz;
    . . .
      parameter a1=1;
      parameter a2=2;

parameter a3=3;
parameter a4=4;
...
endmodule when the module xyz is instantiated, the parameters may be overridden as follows:

xyz #(5,6,7,8) xyz1;

By listing the new values during instantiation, the parameter values are "specified". This statement overrides the values of a1, a2, a3 and a4 with the numbers 5, 6, 7, and 8, during instantiation of a module named xyz1. The order of the parameters in the instantiation corresponds directly to the order in which they are defined within the module. If all of the parameters are not specified, then the parameters are overridden in the order of appearance. For example, if the module instantiation read as follows:

xyz #(5,6) xyz2;

then the value of a1 is set to 5, the value of a2 is set to 6, and the values of a3 and a4 remain at their default values of 3 and 4, respectively.

While parameters are still effectively a compile time option from a customer viewpoint, parameters are governed by different scoping rules than the 'define. A parameter has local scope. It will not be seen at every level of a design. This provides an advantage when working with multiple instantiations of configurable IP. However, parameter statements have some limitations as compared with the 'define directive.

1.2.1. Compile-Time Option for Including or Excluding a Pin on a Module Pin List.

The 'define directive allows a designer to exclude a pin on a module pin list. An illustrative example of a 'define directive for Verilog for including or excluding a pin is provided below.

```
'define APPERIPHERAL__USING__FIFO
module ApPeripheral (
    Input1,
    Input2,
        'ifdef APPERIPHERAL__USING__FIFO
            Input3,
        'endif
    Output1
);
endmodule //ApPeripheral
```

While the 'define directive can be used to include and/or exclude pins, the parameter statement cannot because a parameter cannot be defined until after the pin list is defined. They can be specified directly after the pin list and before the port declarations. An illustrative example is provided below.

```
module Name (<pin list>);
    <parameters>
    <port declarations>
    ...
endmodule
```

Therefore, since the pin list must be specified before the parameters, parameters can be used to specify the width of buses in the port declarations (which can come later), but cannot be used to specify pins on the module pin list. In a preferred embodiment, the parameter function is utilized to specify the bus widths in the port declarations, and unused pins are simply tied off.

1.2.2. Compile-Time Option for Deciding Whether to Include or Exclude a Pin when Instantiating a Module.

The 'define directive can be used to include or exclude a pin when instantiating a module. An illustrative example is provided below.

```
'define APPERIPHERAL__USING__FIFO
...
module ASIC ( ... );
...
    ApPeripheral uPeripheral (
        .Input1 (Input1),
        .Input2 (Input2),
        'ifdef APPERIPHERAL__USING__FIFO
        .Input3 (Input3),
        'endif
        .Output1 (Output1)
    );
...
endmodule //ASIC
```

Unlike the 'define directive, parameter statements cannot be used to determine whether to include a pin when instantiating a module. Parameters cannot be used as text macros for 'ifdef compiler directives but the 'define statement can. The decision to include or exclude code is made at compile time and must be done with a compiler directive. Alternatively, all pins may be included, and customized wrappers may be used to tie-off or hide the pins that are not used in a particular configuration. In general, while the parameter function does not provide all of the power of the 'define directives, the parameter statements are still preferred because the parameter statements provide greater flexibility.

1.2.3. Compile-Time Option for Deciding Whether to Instantiate an Entire Module or to Choose Between Two Modules.

The 'define directive can be used to instantiate a module and to choose between two modules. This is very useful way to save gates in configurable peripherals. An illustrative example is provided below.

```
'define APPERIPHERAL__FIFO1
'define APPERIPHERAL__G12P
...
module ApPeripheral ( ... );
...
    'ifdef APPERIPHERAL__FIFO1
    ApPeripheralFifo uFifo (
        ...
    );
    'endif
    'ifdef APPERIPHERAL__G12P
    ApPeripheralDDR__G12 uDDR (
        ...
    );
    'else //GFlxp
    ApPeripheralDDR__GFlxp uDDR (
        ...
    );
    'endif
    ...
endmodule //ApPeripheral
```

The Verilog array of instances syntax can be used to determine how many instances of one module should be used, but does not allow for zero instances to be specified. Therefore, it does not address the problem of deciding when zero instances of a sub-module is desired. An illustrative example of the syntax for one embodiment of an array of instances construct is shown below.

```
module ASIC ( ... );
    ...
    parameter N = 3;
    ...
    wire [(N-1):0] Input1;
    wire [(N-1):0] Input2;
    wire [(N-1):0] Input3;
    wire [(N-1):0] Output1;
    ...
    ApPeripheral uPeripheral [(N-1):0] (
        .Input1 (Input1),
        .Input2 (Input2),
        .Input3 (Input3),
        .Output1 (Output1)
    );
endmodule //ASIC
```

However, the generate statement (available for example in Verilog-2001) can be used to solve the problem of when zero instances are desired. Additionally, the generate statement in Verilog-2001 can be used to generate multiple instances of modules and also to allow for the case of zero instantiated instances of a module. An illustrative example of the use of parameter statements with a Verilog 2001 "generate" commands for creating an array of instances appears below.

```
module ApPeripheral ( ... );
    ...
    // configuration section
    parameter APPERIPHERAL__FIFO1 = 1;
    // 1=include, 0=exclude
    parameter APPERIPHERAL__G12P = 1;
    // 1=G12P, 0=Gflxp
    ...
    generate //Verilog-2001 syntax
    if (APPERIPHERAL__FIFO1 == 1)
    ApPeripheralFiFo uFifo (
    ...
    );
    else
        //assign all FIFO output pins to
        //known values if no instantiation
        // so that they are driven.
    endgenerate
```

It is also possible to generate the array of instances using a case statement (in Verilog 2001) as follows.

```
generate //Verilog-2001 syntax
case (APPERIPHERAL__G12P)
    0: ApPeripheralDDR__GFlxp uDDR ( ... );
    1: ApPeripheralDDR__G12 uDDR ( ... );
    default: ApPeripheralDDR__G12 uDDR ( ... );
endcase
endgenerate
...
endmodule //ApPeripheral
```

In general, the generate method is preferred over the 'define method because the generate method can be used to instantiate multiple peripheral devices with different configuration options for each instantiation, without having to edit or uniquify the RTL.

1.2.4. Compile-Time Option for Determining Whether to Include Logic in the Module.

The 'define directive can be used to include or exclude logic from the module. An illustrative example is provided below.

```
'ifdef APPERIPHERAL__FIFO
    always @ ( ... ) begin
    ...
    end
'endif
'ifdef APPERIPHERAL__FIFO
    assign Variable1 = statement1;
'endif
'ifdef APPERIPHERAL__FIFO
    assign Variable2 = statement1;
'else
    assign Variable2 = statement2;
'endif
```

Parameter statements and generate commands can be used in Verilog-2001 syntax to include logic in the module. An illustrative example appears below.

```
module ApPeripheral ( ... );
...
//configuration section
parameter APPERIPHERAL__FIFO = 1;
...
generate //Verilog-2001 syntax
    if (APPERIPHERAL__FIFO == 1) begin
        always @ ( ... ) begin
        end
    end
endgenerate
generate //Verilog-2001 syntax
    if (APPERIPHERAL__FIFO == 1) begin
        assign Variable1 = statement1;
    end
endgenerate
generate //Verilog-2001 syntax
    if (APPERIPHERAL__FIFO == 1) begin
        assign Variable2 = statement1;
    else
        assign Variable2 = statement2;
    end
endgenerate
endmodule // ApPeripheral
```

Thus, the parameter statements and generate commands can be utilized in order to choose between including or excluding logic from the module. The parameter and generate statements can be used to produce multiple instantiations of a peripheral device with different configuration options for each instantiation without having to edit or to uniquify the RTL for each instantiation. In general, the present invention makes use of both parameter statements and generate commands to reuse configurable peripherals in a single module without having to uniquely name each instantiation of a particular peripheral.

1.2.5. Compile-Time Option for Determining Whether to Include Variables.

The 'define directive can be used to determine whether to include variables in continuous assignment statements and "always" procedure statements and their sensitivity lists. An illustrative example appears below.

```
        always @ (statement1 or
        'ifdef APPERIPHERAL_FIFO
                statement2 or
        'endif
                statement3) begin
            if ( (statement1) |
        'ifdef APPERIPHERAL_FIFO
                (statement2) |
        'endif
                (statement3) ) begin
            ...
            end
        end
        assign Write = (statement1 |
                'ifdef APPERIPHERAL_FIFO
                    statement2 |
                'endif
                    statement3);
```

Parameters can be used like a strap pin to cancel out the effect of a statement if it is not wanted for a particular configuration. The downside is a slight performance decrease for the extra logic needed.

```
        parameter APPERIPHERAL_FIFO = 1;
        //1=exists, 0=doesn't exist
        always @ (statement1 or statement2 or
        statement3) begin
            if (statement1 | (APPERIPHERAL_FIFO &
            statement2) |
            statement3) begin
            ...
            end
        end
        assign Write = statement1 |
            (APPERIPHERAL_FIFO & statement2) |
            statement3;
```

Another method involves using the generate statement to choose between the multiple configurations. This option requires Verilog-2001.

```
        parameter APPERIPHERAL_FIFO = 1;
        //1=exists, 0=doesn't exist
        generate //Verilog-2001 syntax
        if (APPERIPHERAL_FIFO == 1) begin
        always @ (statement1 or statement2 or
        statement3) begin
            if (statement1 | statement2 | statement3) begin
            ...
            end
        else
        always @ (statement1 or statement3) begin
            if (statement1 | statement3) begin
            ...
            end
        end
        endgenerate
        generate //Verilog-2001 syntax
        if (APPERIPHERAL_FIFO == 1) begin
                assign Write = statement1 | statement2
                | statement3;
        else
                assign Write = statement1 |
                statement3;
        end
        endgenerate
```

In general, the present invention utilizes parameter statements and/or generate commands to determine whether to include variables. While this can be done using 'define statements, the parameter statements and generate commands can be used to produce multiple instantiations of a peripheral device with different configuration options for each instantiation, without having to edit or to uniquify the RTL for each instantiation. In a preferred embodiment, variables are included or canceled out using parameter statements and/or generate commands.

1.2.6. Compile-Time Option for Determining the Width of the Buses.

The 'define directive can be used to determine the width of buses, pin widths or signal widths when they are declared and used. An illustrative example of the code for determining the width of buses is provided below.

```
        ApPeripheral (
                Input1,
                Input2,
                Output1
        );
        //configuration section
        'define APPERIPHERAL_ADR_WIDTH 4
                input Input1;
                input Input2;
                output [('APPERIPHERAL_ADR_WIDTH-1):0]
                Output1;
                wire [('APPERIPHERAL_ADR_WIDTH-1):0]
                Output1;
        ...
        endmodule //ApPeripheral
```

The parameter statements can be used to determine the width of buses when they are declared and used. Since the parameter statements can be used to produce multiple instantiations of a peripheral device with different configurations and without requiring editing or uniquifying of the RTL code, parameter statements are generally preferable to the 'define directives. An illustrative example of the syntax of an embodiment of the statement is provided below.

```
        ApPeripheral (
                Input1,
                Input2,
                Output1
        );
        //configuration section
        parameter APPERIPHERAL_ADR_WIDTH = 4;
                input Input1;
                input Input2;
                output [(APPERIPHERAL_ADR_WIDTH-1):0]
                Output1;
                wire [(APPERIPHERAL_ADR_WIDTH-1):0]
                Output1;
        ...
        endmodule //ApPeripheral
```

By using the defparam statement during instantiation, or by specifying the parameters during instantiation of the port declarations, the default parameters can be modified to instantiate modules with different dimensions without having to rewrite the code block.

1.2.7. Compile-Time Option for Specifying Various Constants in a Module.

The 'define directive can be used to specify various constants in a module, such as values for states for a state machine or AHB bus definitions. An illustrative example of 'define directives for specifying constants is provided below.

```
module ApPeripheral ( ... );
    ...
        'define AP_PERIPH_IDLE 2'b00
        'define AP_PERIPH_READ 2'b01
        'define AP_PERIPH_WRITE 2'b10
        'define AP_PERIPH_WAIT 2'b11
    ...
        'define AP_PERIPH_OKAY 2'b00
        'define AP_PERIPH_ERROR 2'b01
    ...
endmodule //ApPeripheral
```

The parameter statements can also be used to specify various constants in a module such as values for states for a state machine or AHB bus definitions. An illustrative example is provided below.

```
module ApPeripheral ( ... );
    ...
        parameter AP_PERIPH_IDLE = 2'b00;
        parameter AP_PERIPH_READ = 2'b01;
        parameter AP_PERIPH_WRITE = 2'b10;
        parameter AP_PERIPH_WAIT = 2'b11;
    ...
        parameter AP_PERIPH_OKAY = 2'b00;
        parameter AP_PERIPH_ERROR = 2'b01;
    ...
endmodule //ApPeripheral
```

Since the parameter statements provide a means for instantiating multiple peripheral devices with different configurations and without requiring editing or uniquifying of the RTL code, in a preferred embodiment the system utilizes parameter statements to specify constants.

1.2.8. Compile-Time Option for Creating Other Configuration Constants.

The 'define directive can be used to create other configuration constants based on a top-level configuration setting. An illustrative example of this technique is provided below.

```
'ifdef APPERIPERAL_FIFO
    'define APPERIPERAL_FIFO0_ACTIVE
    'define APPERIPERAL_FIFO1_ACTIVE
'else
    'define APPERIPHAL_FIFO0_OFF
    'define APPERIPHAL_FIFO1_OFF
'endif
```

In prior versions of Verilog (for example), all parameters were required to be defined, and could not be derived. Using Verilog-2001, the generate command cannot be used since constant declarations are not permitted in a generate statement. Verilog-2001 has a new feature called constant functions, which can be called any time a constant expression value is required. For example, the constant functions can be used to calculate the width of a vector based on the sizes of arrays. An illustrative example of syntax for calculating the width using parameters and constant functions appears below.

```
module ram ( ... );
    parameter SIZE = 1024;
    input [clogb2(SIZE)-1:0] address_bus;
    //must be constant
    function integer clogb2 (input integer depth)
    begin
        for(clogb2=0; depth>0; clogb2=clogb2+1)
            depth = depth >> 1;
    end
    endfunction
endmodule
```

Thus, the constant functions can be used to derive some parameters from others set by the user. This is different from the 'define directives, which can specify constants, but which cannot utilize constant functions to derive parameters from other parameters set by a user. In general, the parameter statement provides greater flexibility to the designer.

1.2.9. Compile-Time Option for Instantiating Multiple Instantiations of Peripherals having Different Configurations.

A parameter can be easily redefined when instantiated with either implicit or explicit parameter redefinition. Parameter redefinition allows the same peripheral to be configured differently for different instantiations. The file names, module names, and parameter names do not need to be rendered unique as is required by the 'define directive. Methods valid for implicit and explicit parameter overrides are shown below.

```
module ASIC ( ... );
//implicit parameter redefinition by position
parameter ADR_WIDTH = 4;
ApPeripheral #(ADR_WIDTH) uPeripheral ( ... );
...
endmodule //ASIC
module ASIC ( ... );
...
//explicit parameter redefinition by name
defparam uPeripheral.APPERIPHERAL_ADR_WIDTH = 8;
ApPeripheral uPeripheral ( ... );
...
endmodule //ASIC
```

Additionally, the Verilog-2001 standard introduces a third way to redefine a parameter on an instantiated module, involving an in-line explicit parameter redefinition. An illustrative example of the method is provided below.

```
module ASIC ( ... );
...
//Valid for Verilog-2001 only
//in-line explicit parameter redefinition
ApPeripheral #(.ADR_WIDTH(4)) uPeripheral ( ... );
...
endmodule //ASIC
```

Referring again to FIG. 2, the advantage of compile-time options 204 is the ability to remove logic from a peripheral for gate savings. The disadvantage is that the configuration needs to be determined before synthesis. Generally, compile-time options can be utilized to add components to the design or to remove components from the design. Other, more specific, examples of utilizing compile-time options for peripherals may include determining the number of AHB ports on the peripherals and/or altering the number of first input/first outputs (FIFOs) in the peripheral. However, in general, the parameter statements and generate commands are preferred over 'define directives because they offer greater flexibility to the designer while effectively achieving similar results.

1.3. Strap-Pin Configurable Hardware Option

The strap-pin option 206 refers to a physical option that can be used later in the design process. The strap-pin option 206 involves tying off a pin or leaving a pin unconnected if the pin is an output, depending on the specific implementation. Generally, all inputs must be tied to a value (such as "high" or "low"), and outputs may be left open. Typically, a particular pin is either tied to power or to ground when the peripheral is integrated into the design. Such a pin must be intended to be static during operation. Once the chip is made, the pin setting cannot be changed; however, the strap-pin option makes it possible to use one peripheral to support different features, saving both development and support time. An example of using the strap-pin option 206 includes selecting between big and little endian formats. Big-endian and little-endian are terms that describe the order in which a sequence of bytes are stored in computer memory. Big-endian is an order in which the most significant value in the sequence is stored first at the lowest storage address. Little-endian is an order in which the least significant value in the sequence is stored first. Additionally, the strap pin method can be used for selecting between bus widths, such as between 32-bit and 64-bit data bus widths.

1.4. Programmable Configurable Hardware Option

The programmable option 208 allows customers to change the function of the peripheral using software, such as a software program written in C code C code or other similar languages. This technique allows the customer to make changes to the design after the chip is manufactured. The customer can use one chip for several different products by using different software packages for each product.

Unfortunately, if the programmable option is used by itself, unused logic remains in the design. Additionally, if there are many configuration steps, the configuration processes can be confusing and time consuming. An example of a programmable option for peripherals may include the selection of the priority mechanism used by an SOC bus arbiter function between fixed and rotating priority. In this instance, the selection of the arbitration function is under software control and can be changed dynamically while the system is operating. The programmability of this function allows it to be more flexible in adapting the system to improve performance while the system is operating.

2. Reusable Software Peripherals and Structures

In general, as more and more configurable peripherals are being introduced into circuit design, corresponding or associated software is required. To facilitate software development, software code blocks corresponding to the configurable (and reusable) circuit blocks should be designed to be modular and reusable. In many of the examples appearing below, code blocks are shown in C code, but it will be understood by a worker skilled in the art that other programming languages could also be used. Additionally, the following discussion assumes that a full runtime environment has been started with the CPU configured, memory system initialized, stacks created, and interrupts enabled.

Figure 3:
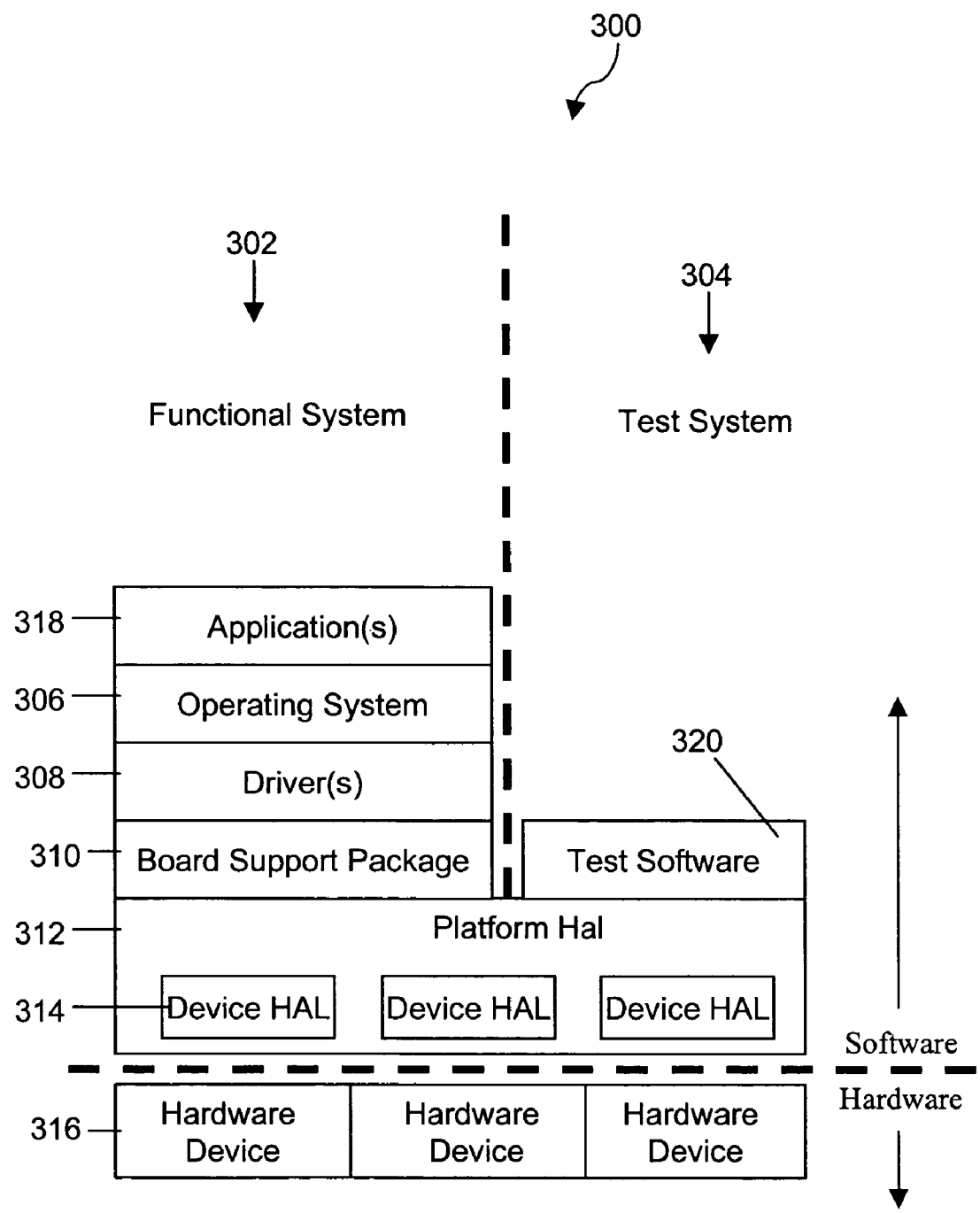
FIG. 3 is a simplified block diagram of a software hierarchy for a given system.

Referring now to FIG. 3, the lowest levels of the software hierarchy of any system 300 capable of interacting or interfacing with a hardware peripheral are the same for any system 300. In general, systems 300 capable of interacting or interfacing with a hardware peripheral can be conceptualized as either a functional system 302 or a test system 304. Functional systems 302 typically have a complete software stack including an operating system 306 and associated drivers 308, which interact with a Board Support Package (BSP) 310. The BSP 310 interfaces with a platform Hardware Abstraction Layer (HAL) 312 and the device HALs 314 for each hardware device 316.

Generally, a Hardware Abstraction Layer is firmware which provides an interface between multiple function blocks on an integrated circuit and code designed to exercise the integrated circuit. The firmware code forms a layer between the hardware and software, allowing any software which uses a HAL to be more easily ported to operate with a different integrated circuit.

Software applications 318 can be run in the functional system 302 on top of the Operating System 306 and in conjunction with the underlying software elements. By contrast, test systems 304 typically have very simple environments without an operating system. The test system 304 typically includes test software 320, which can be used to verify the hardware environment or to test software components without the extra burden of a full operating system.

An operating system 306 is software that provides an interface between application software 318 and hardware 316. Typically, an operating system 306 provides features like process scheduling and provides a common interface to the hardware and system resources through an application program interface (API). Application software 318 is the highest level of software. It is usually the user's application, which runs on top of an operating system 306. The application software 318 typically does the real work of the system 300.

A device HAL 314 is software that hides the hardware details of the device. Typically, the device HAL 314 consists of a header file that defines names and variables from important hardware features and a C code or assembly file that includes functions or macros to perform useful operations in the hardware. A platform HAL 312 contains instantiation information for device HALs 314 and other information to complete a definition of the system 300. A platform HAL 312 can be compiled, but device HALs may not contain enough information to compile. The platform HAL 312 provides an interface to a higher level object like the board support package (BSP) software 310 or test software 320.

The BSP 310 is a layer of software that isolates an operating system 306 from the hardware details of a specific system. Typically, the BSP 310 is specific to an operating system 306, in part, because different operating systems 306 define different requirements for the BSP 310. The BSP 310 should generally be written to interface to the platform HAL 312. Some programmers refer to the BSP software layer 310 as a HAL.

A driver 308, also referred to as a "device driver", is a piece of code that is part of an operating system 306 and that provides an interface to a hardware device. The operating system 306 defines the features that the driver 308 must implement, and the driver 308 translates those features into the specific hardware actions required by the device. Drivers 308 are operating system dependent because different operating systems 306 have different requirements for the driver 308.

2.1. Reusable Software Device HAL

In an embodiment of the present invention, the device HAL consists of two files: a header file and C code file. The header file is named, for example, <device>.h and the C code file is named <device>.c. All objects in the device HAL are coded to be independent of any specific implementation. Base addresses of registers are defined as variable rather than specified, and interrupt locations are also variable. The specific locations of device based addresses and interrupt connections are defined in the platform HAL.

Names of defines include the device name to prevent collisions. While collisions not likely to be a problem in data structure definitions because the name of the data structures are unique, collisions can be a problem in cases of defining base addresses or similar features that are common to many objects. Everything in the device HAL should be general in nature and usable by any application. No application-specific or test-specific definitions or functions should be included. Anything specific should be included in a platform HAL or the test code.

2.1.1. Reusable Software Device HAL Header File

The header file provides a data structure for the device. The header file may include a sentinel to prevent a header from being loaded multiple times. The header file also includes definitions of useful constants for the device, definitions of data structures used by the device (such as buffer descriptors and the like), and definitions of data structures for register fields.

A data structure for a whole register set for the device, in one embodiment, can be set up using type definitions in the header file. Volatile variables are used for the device registers to prevent the compiler from "optimizing out" operations like back-to-back reads of the same address. An illustrative example of a header appears below.

```
// The device in this example is called hwdev.
typedef unsigned long uint32;
typedef volatile uint32 uint32v;
    /* volatile variables are used for device
    registers to prevent the compiler from
    optimizing out operations like back-to-back
    reads of the same address*/
typedef uint32v * uint32vp;
    /* pointer to volatile unsigned word reg*/
typedef struct t_hwdev {
    uint32v reg0;
    uint32v reg1;
    uint32v reg2;
    uint32v reg3;
    uint32v reg4;
} hwdev_t, *phwdev_t;
```

Additionally, the header may include prototypes for any functions contained in an associated C code file. Finally, in addition to other code elements, the header may include masks for fields contained in the register. For example, a field within a register can be named within the header file using a mask, such as "<devicename>_<fieldname>". In a preferred method for accessing the configuration register for a device, the configuration registers are accessed through a data structure for the device, so that the multiple instantiations of a device can be easily referenced without making changes to the header file.

An illustrative example of a Device HAL header file is provided below.

```
/****************************************************
*
* Copyright (c) 2003 LSI Logic Corporation
* All Rights Reserved
*
```

```
* File: $RCSfile: timer.h.rca $
* Revision: $Revision: 1.1 $
* Purpose: Globals for Timer peripheral
*
* Date Author's Change
* (mmddyy) Initials History
*
****************************************************/
#ifndef _TIMER_H
#define _TIMER_H
#ifdef 0
    /* This example uses the following typedefs
    which are assumed to be defined elsewhere.
    */
typedef unsigned long uint32;
typedef volitile uint32 uint32v;
typedef uint32v * uint32vp;
    /* pointer to a volatile unsigned word */
#endif /* ifdef 0 */
typedef struct t_timerdev
{
    uint32v Timer1;
    uint32v Timer1Prescale;
    uint32v Timer1Control;
    uint32v Timer2;
    uint32v Timer2Prescale;
    uint32v Timer2Control;
    uint32v TriggerPt1;
    uint32v TriggerPt2;
    uint32v TriggerPt3;
    uint32v TriggerPt4;
    uint32v TriggerPt5;
    uint32v TriggerPt6;
    uint32v TriggerControl;
} timerdev_t, *ptimerdev_t;
#endif /* _TIMER_H */
```

In the case of a simple device all that is required in the header file is a data structure definition for the registers in the device.

2.1.2. Reusable Software Device HAL C Code File

All functions in the C code file are named <devicename>_<functionname>( ) to prevent having function names conflict or collide with functions for other devices. For example, a function named "init( )" is likely to exist for many different hardware devices.

A basic initialization function named <device name>_init( ) can be used to initialize the device into a typical operational mode. If there are several common modes for device, these modes can be handled by multiple functions or by a parameter for the function. An example of this would be FIFO or non-FIFO mode for a Universal Asynchronous Receiver/Transmitter (UART). An illustrative example of the C code for initializing the hwdev device is provided below.

```
void hwdev_init (phwdev_t pdev) {
    pdev->reg0 = 0x00000000;
    pdev->reg1 = 0x11111111;
    pdev->reg2 = 0x22222222;
    pdev->reg3 = 0x33333333;
    pdev->reg4 = 0x44444444;
}
```

As shown, the hwdev_init( ) function is called with a variable register address, which is then used by the function to initialize the registers. In this way, the initialization routine is coded to be specific to a device so that conflicts are eliminated; and moreover the memory addresses are programmed to be variable so that they can be configured on the fly.

The C code file also includes functions to initialize data structures used by the device. An example of this would be a function to create and initialize the Buffer Memory Descriptors (BMD) chain for a Direct Memory Access (DMA) device. The C code file may also include an interrupt handler and instantiations of data structures with expected reset values and read/write masks, of which an illustrative example appears below.

```
hwdev_t hwdev_expected, hwdev_rw;
//expected reset values
hwdev_expected->reg0 = 0x00000000;
hwdev_expected->reg1 = 0x00000000;
hwdev_expected->reg2 = 0x00000000;
hwdev_expected->reg3 = 0x00000000;
hwdev_expected->reg4 = 0x00000000;
//read-write masks
hwdev_rw->reg0 = 0xFFFF0FFF;
hwdev_rw->reg1 = 0x000000FF;
hwdev_rw->reg2 = 0x0000FFFF;
hwdev_rw->reg3 = 0x00000EFF;
hwdev_rw->reg4 = 0x00000007;
```

An illustrative example of a C code file corresponding to the header file (provided in section 2.1.1 above) is presented below.

```
/***************************************************
* Copyright (c) 2003 LSI Logic Corporation - All
Rights Reserved
*
* File: $RCSfile: timer.c.rca $
* Revision: $Revision: 1.1 $
* Purpose: Globals for Timer peripheral
*
* Date Author's Change
* (mmddyy) Initials History
***************************************************/
/* initalization routine */
void timer_init ( timerdev_t ptimer) {
  ptimer->Timer1;
  ptimer->Timer1Prescale;
  ptimer->Timer1Control;
  ptimer->Timer2;
  ptimer->Timer2Prescale;
  ptimer->Timer2Control;
  ptimer->TriggerPt1;
  ptimer->TriggerPt2;
  ptimer->TriggerPt3;
  ptimer->TriggerPt4;
  ptimer->TriggerPt5;
  ptimer->TriggerPt6;
  ptimer->TriggerControl;
}
/* read/write mask */
timerdev_t timer_rw;
  timer_rw->Timer1 = 0x00000000;
  timer_rw->Timer1Prescale = 0x00000FFF;
  timer_rw->Timer1Control = 0x00000EFF;
  timer_rw->Timer2 = 0x00000000;
  timer_rw->Timer2Prescale = 0x00000FFF;
  timer_rw->Timer2Control = 0x00000EFF;
  timer_rw->TriggerPt1 = 0xFFFFFFFF;
  timer_rw->TriggerPt2 = 0xFFFFFFFF;
  timer_rw->TriggerPt3 = 0xFFFFFFFF;
  timer_rw->TriggerPt4 = 0xFFFFFFFF;
  timer_rw->TriggerPt5 = 0xFFFFFFFF;
  timer_rw->TriggerPt6 = 0xFFFFFFFF;
  timer_rw->TriggerControl = 0x000000FF;
/* expected reset values */
timerdev_t timer_expected;
  timer_expected->Timer1 = 0x00000000;
  timer_expected->Timer1Prescale =
    0x00000000;
  timer_expected->Timer1Control = 0x00000000;
  timer_expected->Timer2 = 0x00000000;
  timer_expected->Timer2Prescale =
    0x00000000;
  timer_expected->Timer2Control = 0x00000000;
  timer_expected->TriggerPt1 = 0x00000000;
  timer_expected->TriggerPt2 = 0x00000000;
  timer_expected->TriggerPt3 = 0x00000000;
  timer_expected->TriggerPt4 = 0x00000000;
  timer_expected->TriggerPt5 = 0x00000000;
  timer_expected->TriggerPt6 = 0x00000000;
  timer_expected->TriggerControl =
    0x00000000;
```

2.2. Reusable Software Peripheral Platform HAL

Like the device HAL, the platform HAL consists of two C code files: a header file named <platformame>.h and a C code file named <platformame>.c. In general, the platform HAL provides the device specific information for the device HAL. Additionally, the platform HAL is designed so that the user does not need to reprogram the entire platform HAL for each new instantiation.

2.2.1. Reusable Software Peripheral Platform Hal Header File

The platform HAL header file defines a memory map and the interrupt connections for the system. The platform HAL header file includes base addresses for the device registers named <device name>_base, so that collisions or conflicts between the platform HAL for various devices are eliminated. An illustrative example of the assignment of base addresses to the device registers for the HWDEV device appears below.

define HWDEV_0_BASE=0x80000000;
define HWDEV_1_BASE=0x90000000;

Interrupt assignments may vary depending on the interrupt controller type and configuration. For example, the interrupt assignments may be different when using cascaded Vector Interrupt Controllers (VICs) as compared with a single VIC.

2.2.2. Reusable Software Peripheral Platform HAL C Code File

The platform HAL C code file contains any functional code that is useful at the platform level. The C code file may include instantiations to the data structure so the device is included in the platform. An illustrative example of the instantiation code is provided below.

phwdev_t HwDevice0=((phwdev_t)HWDEV_0_BASE);
phwdev_t HwDevice1=((phwdev_t)HWDEV_1_BASE);

Additionally, the C code file may include subsystem initialization that calls the initialization routines of the device HALs used by the particular device. In general, the platform HALs provide device specific addresses and other information to the device HAL, which is coded using variable addresses so that the code blocks can be reused without renaming each code block. Thus, the platform HAL can be recoded to provide specific address data, for example, without having to make corresponding changes to the device HAL code.

2.3. Reusable Software Peripheral Coordination

The device HAL header and C code files provide a general data structure of a whole register set of the peripheral. This general data structure can then be adapted readily for reuse, simply by utilizing device-specific function calls.

The platform HAL header and C code files define base addresses for each use of a peripheral. In this way, utilizing code blocks such as those provided above, registers can be defined by the platform HAL by calling initialization functions with a memory location, which is then used by the initialization function to initialize the registers at the memory location provided. Thus, the platform HAL can utilize the same software block to perform the same initialization routine for multiple instances, simply by providing a different location to the initialization block each time.

The Device and/or Platform HAL can then utilize the general structure of the whole register set of the peripheral to access registers and/or fields within a register. In this way, the device HAL code can be configured to operate with the platform HAL, without having to rewrite the device HAL code for every possible variation.

Figure 4:
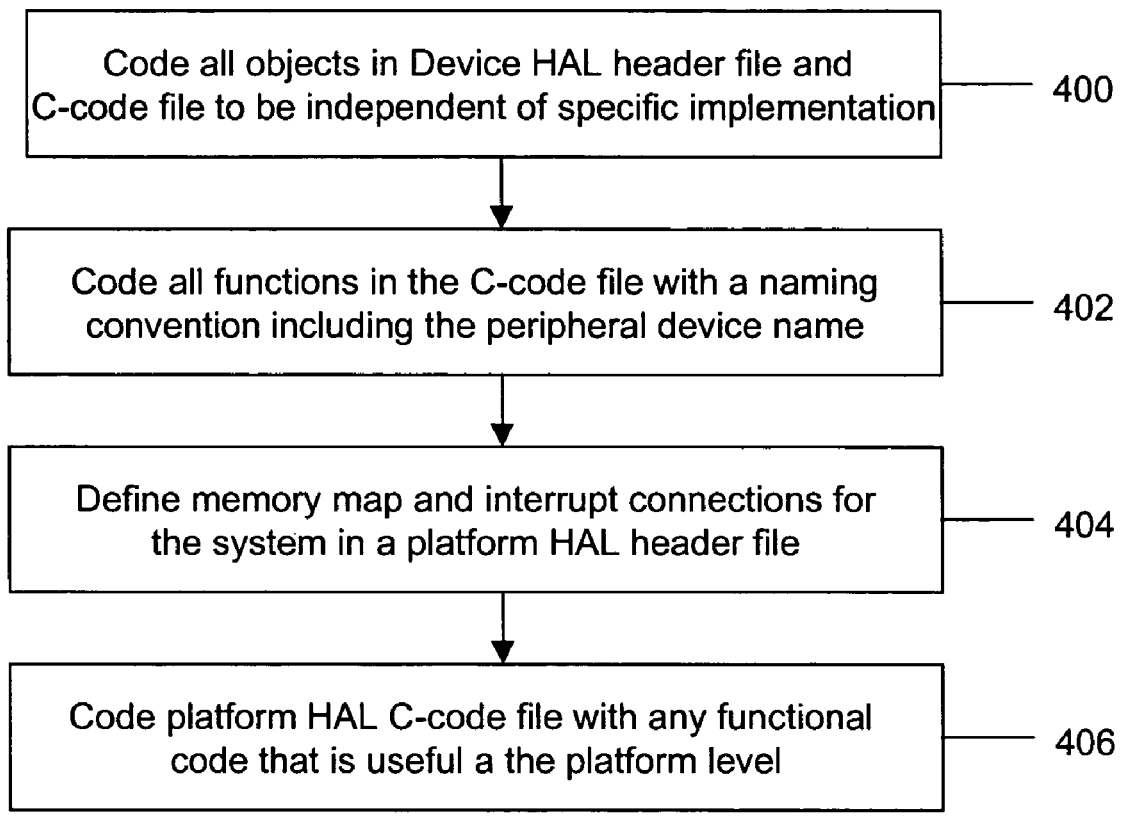
FIG. 4 is a simplified flow diagram of a method for producing reusable software peripherals.

Referring now to FIG. 4, a simplified flow diagram illustrative of an embodiment of the reusable software technique of the present invention is presented. The designer codes all objects in the device HAL header file and device HAL C code file to be independent of any specific peripheral implementation (step 400). The designer codes all functions in the device HAL C code file using a naming convention including the peripheral device name (step 402). The designer defines the memory map and interrupt connections for the system in a platform HAL header file (step 404). The designer codes any additional functional code useful to the platform level in the platform HAL C code file (step 406). Finally, when the code is compiled, each instantiation of the peripheral within the device HAL is instantiated according to the memory map in the platform HAL header file. This methodology allows the software blocks to be reused without significant coding with each new instantiation.

3. Modular Design Methodology

In general, the above-described approaches provide various assembly level and C code options adapted to implement an optimized chip design. In other words, the various elements of the invention can be utilized independently or, in a preferred embodiment, in conjunction with each other in order to produce a peripheral that is adaptable for specific needs and which is configurable for use with existing software blocks. By combining the hardware "modularization" techniques with the reusable software techniques outlined above, multiple instantiations of a configurable peripheral can co-exist in a design, with different configurations for each instantiation. Moreover, the device HAL and platform HAL code can be adapted for use with each configuration without requiring the programmer to rewrite the device HAL for each instantiation. Thus, embodiments of the present invention can be utilized to design a peripheral with multiple instantiations of a configurable peripheral and with reusable software peripherals.

Figure 5:
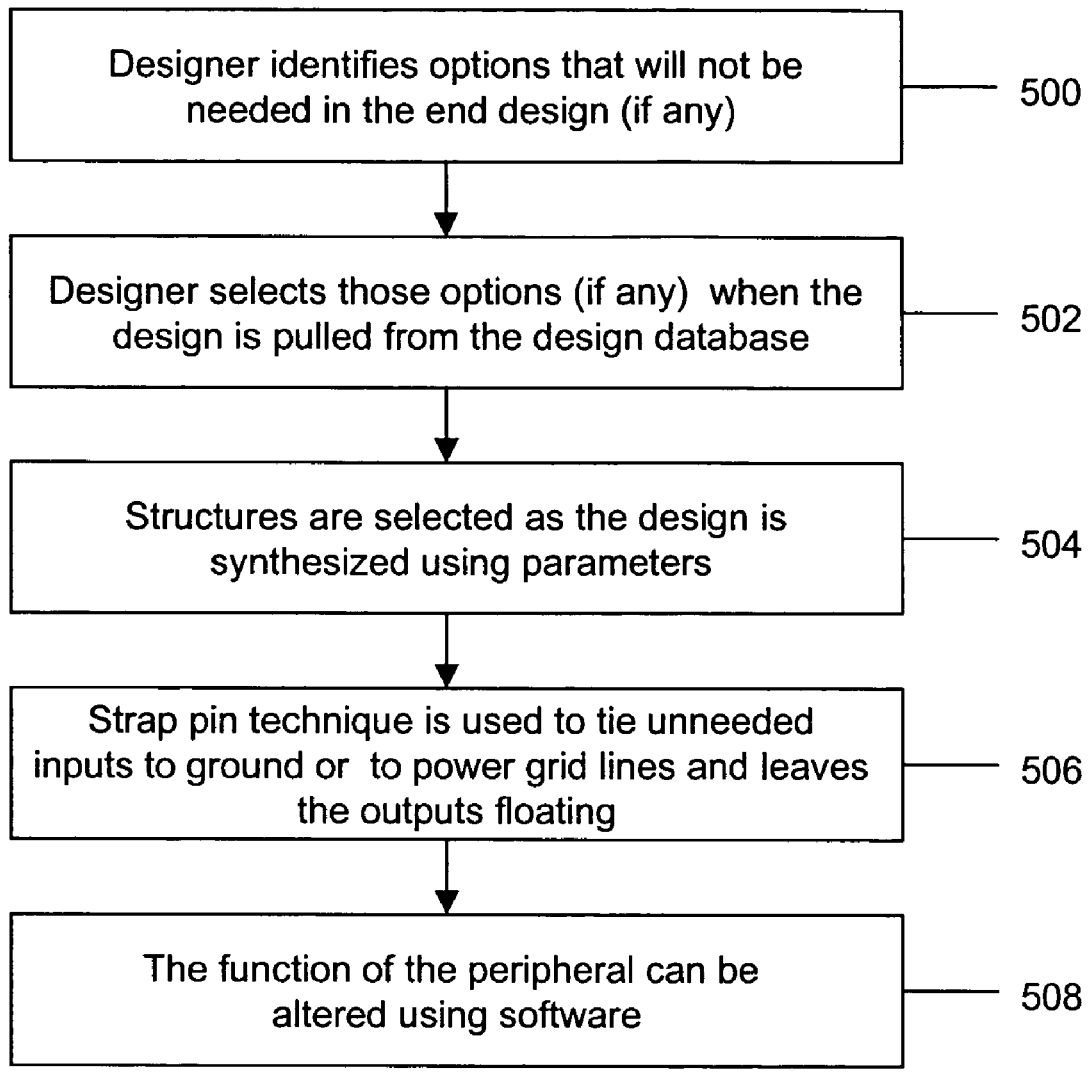
FIG. 5 is a simplified flow diagram for an overall design implementation utilizing both configurable hardware and reusable software techniques.

As shown in FIG. 5, a simplified flow diagram illustrates an embodiment of the design flow process according to the present invention. As shown, a designer identifies options that will not be needed in the end design (step 500) and selects those options (if any) when the design is pulled from the design database (step 502). At compile time for the RTL code, the structures are selected as the design is synthesized using parameters (step 504). To the extent that included structures are determined to be unnecessary, a strap pin technique ties the inputs to ground or to power grid lines and leaves the outputs floating (step 506). Finally, the function of the peripheral can be altered using software (step 508).

As discussed above, the device HAL software can be coded such that addresses for the various structures can be assigned by the platform HAL. In this manner, the functionality and the definitions of various software structures can be modular in design. One embodiment of the present invention is directed to a reusable software structure for accelerated design of integrated circuits utilizing reusable IP blocks.

While the embodiments of the present invention have largely been described with respect to C code programming language, other programming languages and code structures may be employed without departing from the scope or spirit of the present invention. Although the present invention has been described with reference to preferred embodiments, workers skilled in the art will recognize that changes may be made in form and detail without departing from the spirit and scope of the invention.

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

What is claimed is:

1. A reusable software block stored in a computer-readable memory, the reusable software block comprising:
    a device hardware abstraction software layer adapted to configure multiple instantiations of a peripheral device within an integrated circuit, the hardware abstraction software layer defining, relative to a variable base address received as a parameter passed to the device hardware abstraction software layer, offset values for registers of the peripheral device and defining a data structure for the peripheral device that accesses the registers of the peripheral device relative to the variable base address; and;
    a platform hardware abstraction software layer defining an address map of the integrated circuit comprised of a plurality of base addresses, the platform hardware abstraction software layer adapted to configure each instantiation of the peripheral device via calls to the device hardware abstraction software layer, the calls to the device hardware abstraction software layer each passing a one of the plurality of base addresses that correspond to an instantiation of the peripheral device to the device hardware abstraction software layer.

2. The reusable software block of claim 1 wherein the device hardware abstraction software layer comprises:
    memory register locations adapted to be configurable during initialization of the system; and
    an interrupt configuration, which is configured for the peripheral device during initialization of the system.

3. The reusable software block of claim 2 wherein the memory register locations and the interrupt configuration define the data structure of the peripheral device using variables.

4. The reusable software block of claim 1 wherein the data structure of the peripheral device is defined in the device hardware abstraction software layer using variables, the address map comprising:
    memory locations associated with each instantiation of the peripheral device.

5. The reusable software block of claim 4 wherein the platform hardware abstraction software layer initializes each memory location according to the memory map.

6. The reusable software block of claim 1 wherein the data structure of the peripheral device is defined in the device hardware abstraction software layer using variables, the platform hardware abstraction software layer comprising:
    an interrupt configuration corresponding to interrupt connections for a particular implementation of the peripheral device.

7. The reusable software block of claim 6 wherein the interrupt configuration initializes each interrupt connection of the particular implementation of the peripheral device according to the interrupt configuration.

8. A system for instantiating multiple instantiations of a peripheral device within an integrated circuit, the system comprising a single configurable code block, which is stored in a computer-readable memory and comprises:

a device hardware abstraction software layer defining a configurable data structure for the peripheral device relative to a variable base address received as a parameter passed to the device hardware abstraction software layer, the configurable data structure accessing the registers of the peripheral device relative to the variable base address; and a platform hardware abstraction software layer adapted to define a base address of each particular instantiation of the peripheral device and configure each particular instantiation of the peripheral device via calls to the device hardware abstraction software layer, the calls to the device hardware abstraction software layer each passing a defined one of a plurality of base addresses that correspond to each particular instantiation of the peripheral device.

9. The system of claim 8 wherein the device hardware abstraction software layer comprises:

memory register locations adapted to be configurable during initialization; and an interrupt configuration, which configures at least one interrupt connection for the peripheral device during initialization of the system.

10. The system of claim 9 wherein the memory register locations and the interrupt configuration define the structure of the peripheral device using variables.

11. The system of claim 8 wherein the configurable structure of the peripheral device is defined in the device hardware abstraction software layer using variables, the platform hardware abstraction software layer comprising:

a memory map of memory locations of the peripheral device corresponding to a particular implementation of the peripheral device, the memory map adapted to replace the variables with unique memory locations for each instantiation.

12. The system of claim 8 wherein the configurable structure of the peripheral device is defined in the device hardware abstraction software layer using variables, the platform hardware abstraction software layer comprising:

an interrupt configuration corresponding to interrupt connections for a particular implementation of the peripheral device, the interrupt configuration adapted to replace the variables with values that define unique interrupt connections for each instantiation.

* * * * *